United States Patent [19]
Pann et al.

[11] 3,742,435
[45] June 26, 1973

[54] FATHOMETER MEANS AND METHOD

[75] Inventors: Keh Pann; Steven A. Stubblefield, both of Houston, Tex.

[73] Assignee: Texaco Inc., New York, N.Y.

[22] Filed: June 3, 1971

[21] Appl. No.: 149,595

[52] U.S. Cl. ................................................ 340/3 R
[51] Int. Cl. ............................................. G01s 9/68
[58] Field of Search .................... 340/1 R, 3 R, 5 R, 340/6 R, 16 P, 3 F

[56] References Cited
UNITED STATES PATENTS

| | | | |
|---|---|---|---|
| 3,296,579 | 1/1967 | Farr et al. ............................ | 340/3 R |
| 3,469,230 | 9/1969 | Haney et al. ......................... | 340/3 R |
| 3,618,007 | 11/1971 | Anderson ............................ | 340/3 R |

*Primary Examiner*—Richard A. Farley
*Attorney*—Thomas H. Whaley and Carl G. Ries

[57] ABSTRACT

A fathometer, for measuring the depth in water to a sloping bottom surface, includes a transmitter, periodically providing pulses in the water, and at least a pair of receivers arranged in a predetermined manner with the transmitter. Each receiver receives reflection pulses of the transmitted pulses from the sloping surface. Synchronizing pulses coinciding with the transmitted pulse and outputs from corresponding receivers control elapsed time circuits to provide signals corresponding to time intervals. Each time interval starts with the transmission of a pulse by the transmitter and the reception of a reflection pulse by a corresponding receiver. An analog computer provides outputs corresponding to the water's measured depth and to the location of the depth measurement in accordance with the time interval signals and the known predetermined arrangement of the transmitter and the receivers. A recorder provides a record of the depth measurement and its proper location in accordance with the outputs from the analog computer.

7 Claims, 11 Drawing Figures

PATENTED JUN 26 1973 3,742,435

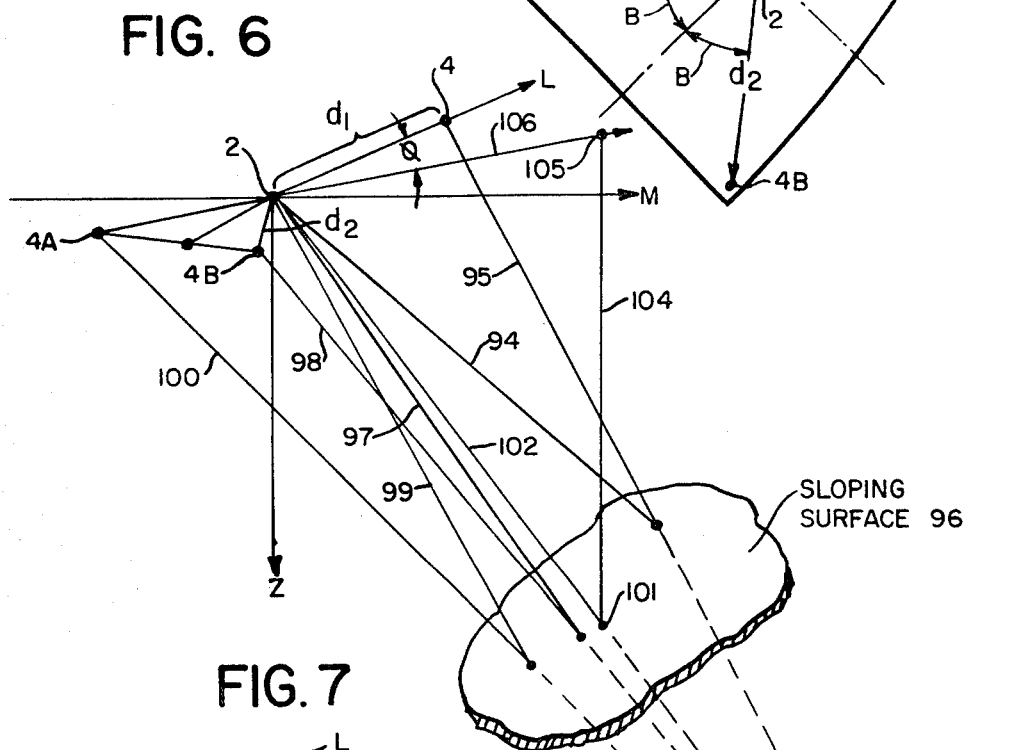

3,742,435

FATHOMETER MEANS AND METHOD

BACKGROUND OF THE INVENTION

The present invention relates to distance measuring devices in general, and more particularly, to fathometers.

DESCRIPTION OF THE PRIOR ART

Fathometer heretofore were intended to measure only the vertical depth. When an inclined bottom surface was encountered, the shortest distance to the inclined water bottom rather than the longer vertical depth was measured. The location of the bottom reflection was erroneously assumed to be vertically beneath the fathometer and the shortest distance was misinterpreted to be the vertical depth. The present invention provides for the correct location of the depth measurement as well as the correct depth measurement itself so that the bottom surface may be mapped with a greater accuracy than heretofore achieved.

SUMMARY OF THE INVENTION

Apparatus for providing outputs corresponding to a depth measurement in a body of water and the location of the depth measurement includes a transmitter transmitting pulses in the water. A plurality of receivers arranged in a predetermined manner receive pulses reflected by a surface underneath the water and provide corresponding outputs. Each elapsed time circuit of a plurality of circuits, related in number to the number of receivers, provides a signal corresponding to the time interval between the transmission of a pulse by the transmitter and the reception of a reflected pulse by a corresponding receiver. The time interval signals are used to develop the outputs corresponding to the depth and to the location of the depth measurement.

One object of the present invention is to measure a depth in water.

Another object of the present invention is to measure a depth in water and to locate the depth measurement.

Another object of the present invention is to provide a fathometer having a transmitter and a plurality of receivers for more accurately mapping the depth in water without limitation as to a bottom surface physical configuration.

Another object of the present invention is to align a transmitter with a plurality of receivers in a predetermined arrangement, so that arrangement of the transmitter and receivers may be used to determine the depth of water.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

DESCRIPTION OF THE DRAWINGS

FIG. 5 shows the arrangement of a transmitter and receivers of a fathometer, constructed in accordance with another embodiment of the present invention.

FIGS. 6 and 7 show the trigonometric relationship of the transmitter and the receivers of the last mentioned fathometer with a point on a surface beneath a body of water.

DESCRIPTION OF THE INVENTION

Figure 1:
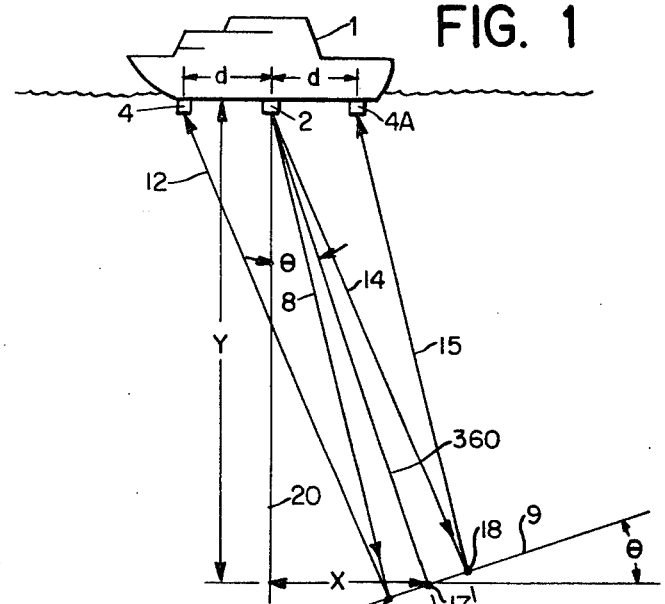
FIG. 1 shows the trigonometric relationship of a transmitter and receivers of a fathometer, constructed in accordance with one embodiment of the present invention, with a point on a surface beneath a body of water.
Figure 2:
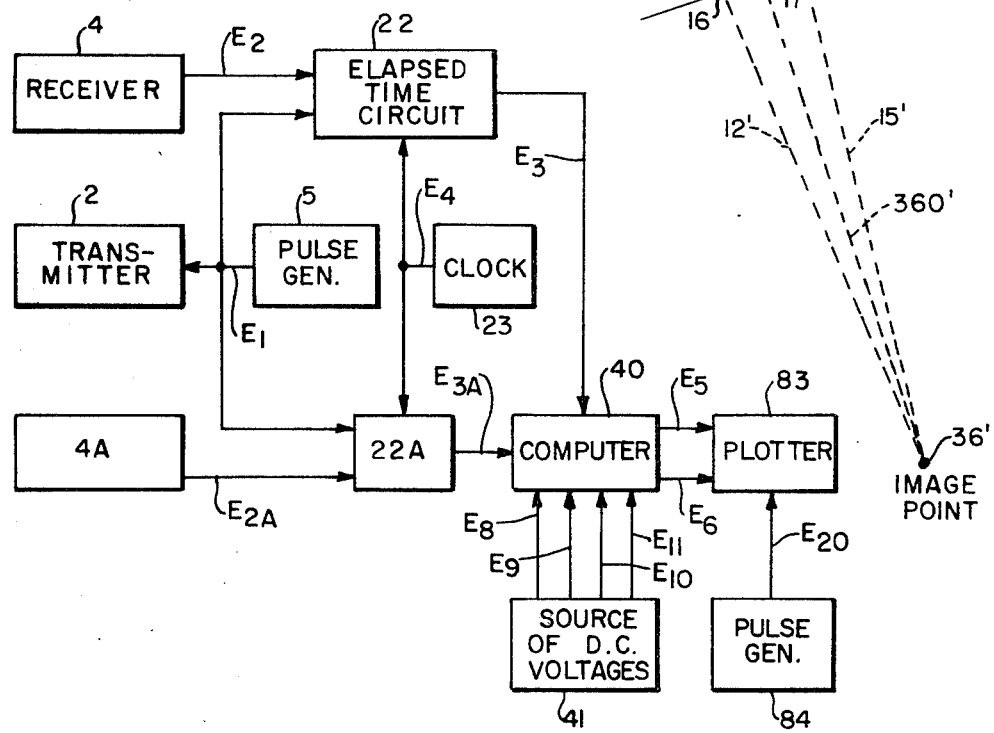
FIG. 2 is a simplified block diagram of the fathometer for measuring the depth of the water at the point on the bottom surface and the offset of that point from a predetermined reference.

Referring to FIGS. 1 and 2, there is shown a method of increasing the accuracy for mapping a sloping surface under water. A boat 1, sailing along a line of greatest declination of the sloping surface, has a transmitter 2 separating receivers 4, 4A, all of which have a common axis, which is the longitudinal axis of boat 1. Transmitter 2, which may be a conventional fathometer transmitter provides pulses while receiver 4 is a conventional type hydrophone. Elements having a suffix are connected and operate in a similar manner as elements having the same numeric designation without the suffix. Pulses are transmitted by transmitter 2 in response to pulse $E_1$, provided periodically by a pulse generator 5 on a one-to-one basis.

The shortest paths for the transmitted pulses to receivers 4 and 4A are shown in FIG. 1. A transmitted pulse from transmitter 2 follows line 8 through the water until it strikes a sloping surface 9 whereupon it is reflected along path 12 to receiver 4. The angle $\theta$ is the angle formed by the sloping bottom and a horizontal reference. Similarly, the pulse received by receiver 4A follows a line 14 until it strikes surface and is reflected to receiver 4A along path 15. The use of receivers 4, 4A, allows a determination of the depth Y of a point 17 on sloping surface 9 and an offset distance X of point 17 from a vertical axis 20 passing through transmitter 2. Thus, the system not only describes the water's depth but it also describes the location of the depth measurement with respect to boat 1.

Receivers 4, 4A provide pulse signals $E_2$ and $E_{2A}$, respectively, in response to the received pulses, to lapsed time circuits 22, 22A. Lapsed time circuits 22, 22A provide outputs $E_3$ and $E_{3A}$, respectively, which correspond to the time intervals starting with the transmission of a pulse and terminated by reception of the first reflected pulses by receivers 4 and 4A, respectively. A clock 23 provides timing pulses $E_4$ to lapsed time circuits 22, 22A which are used along with pulses $E_1$, which are synchronized with the transmitted pulses from transmitter 2, from pulse generator 5 in developing outputs $E_3$, $E_{3A}$, as hereinafter explained.

Figure 3:
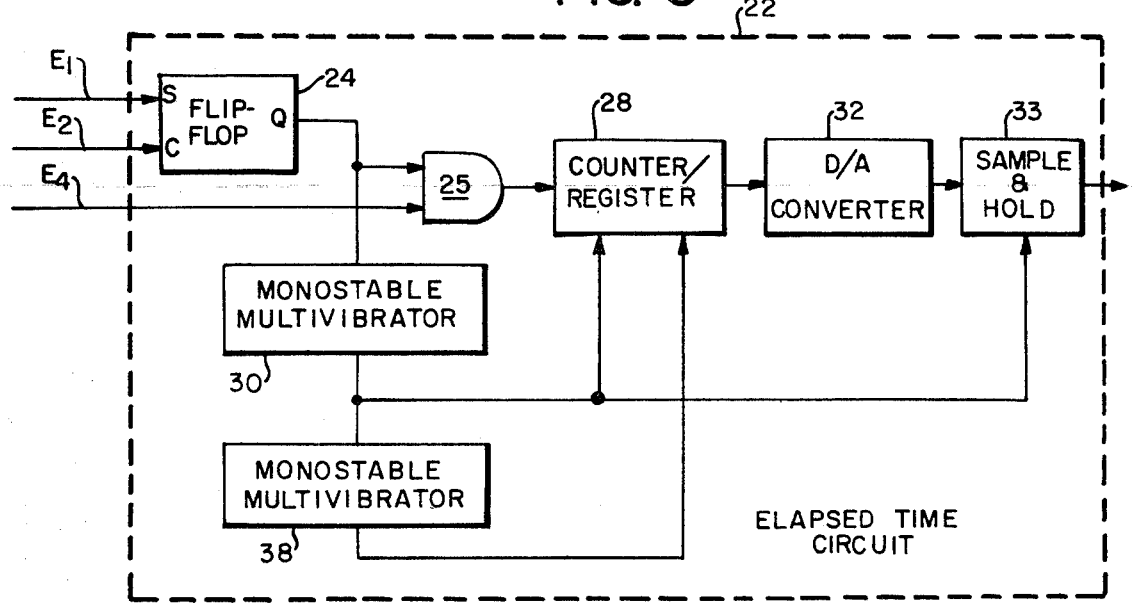
FIGS. 3 and 4 are detailed block diagrams of the elapsed time circuit and the computer, respectively, shown in FIG. 2.

Elapsed time circuit 22 is shown in detail in FIG. 3. A pulse $E_1$ from pulse generator 5 triggers a flip-flop 24 to its set state. Flip-flop 24 provides a high level direct current output when in a set state and a low level direct current output when in a clear state. A high level direct current output from flip-flop 24 enables an AND gate 25 to pass timing pulses $E_4$ while a low level direct current output disables AND gate 25 to block timing pulses $E_4$. The passed pulses from AND gate 25 are counted by a counter-register 28. The first pulse $E_2$ provided by receiver 4 after the occurrence of a pulse $E_1$ triggers flip-flop 24 to its clear state thereby disabling AND gate 25. AND gate 24 blocks timing pulses $E_4$ so that the count in counter-register 28 corresponds to the time difference between pulse $E_1$ and the first pulse $E_2$ from receiver 4.

The change in the output from flip-flop 24 from a high level to a low level triggers a monostable multivibrator 30 causing multivibrator 30 to provide a pulse to counter-register 28. Counter-register 28 includes transfer AND gates which are enabled by the pulse from multivibrator 30 to provide a digital output corresponding to the count to a conventional digital-to-analog converter 32. Converter 32 converts the digital signal to an analog signal which is provided to a conventional type sample and hold circuit 33. Sample and hold circuit 33 is controlled by the pulse from multivibrator 30 to sample and hold the output of converter 32. The width of the pulse from multivibrator 30 should be of a sufficient duration to allow converter 32 to complete the conversion. The trailing edge of the pulse from multivibrator 30 triggers another monostable multivibrator 38 causing it to provide a reset pulse to counter-register 28 resetting counter-register 28 to a zero count.

Circuit 22A develops output $E_{3A}$ from pulses $E_1$, $E_{2A}$ and $E_4$ in a similar manner.

Figure 4:
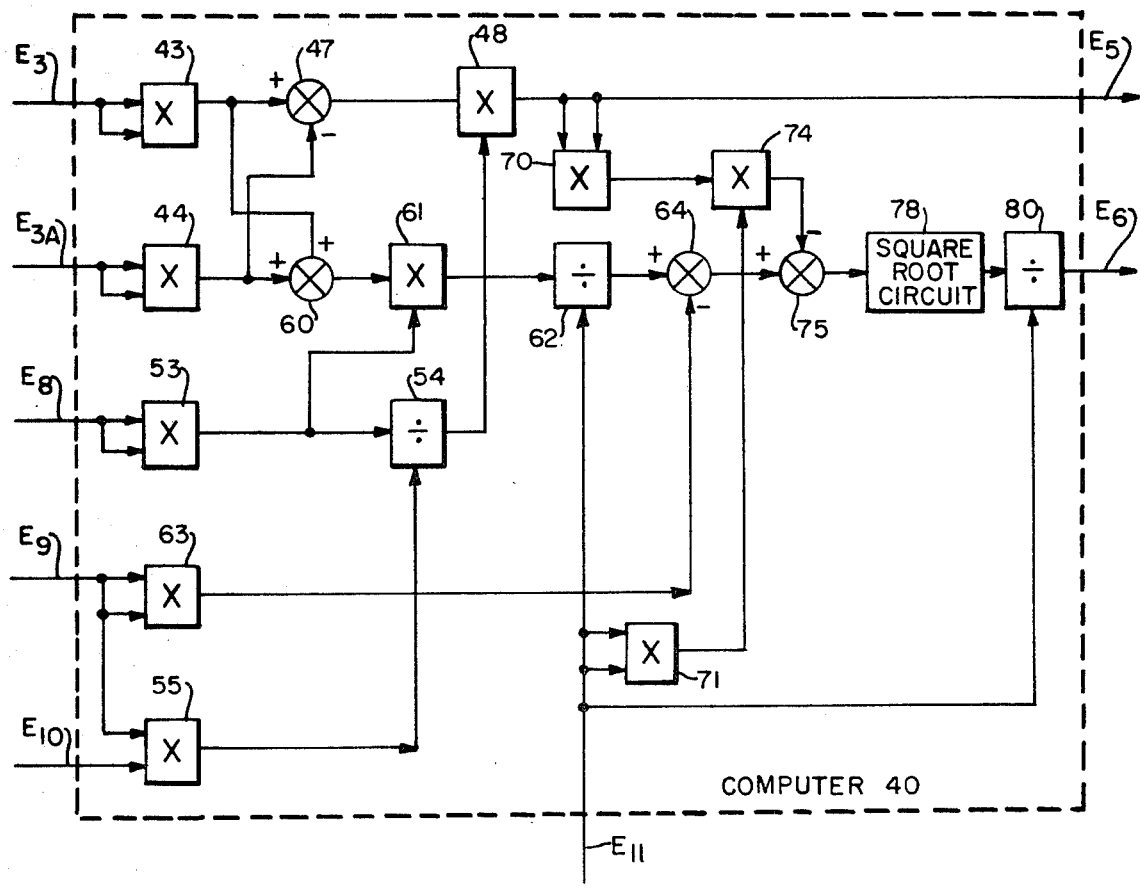

Referring to FIGS. 2 and 4, lapsed time circuits 22, 22A provide outputs $E_3$ and $E_{3A}$, respectively, to a computer 40, which also receives direct current voltages $E_8$ through $E_{11}$ from a source 41 of direct current voltages. Computer 40 computes the depth $Y$ and the offset distance $X$ of point 17 in accordance with the following equations:

$$X = (V^2/8d)(T_1^2 - T_2^2) \quad (1)$$

and $$Y = \tfrac{1}{2}\sqrt{[V^2(T_1^2 + T_2^2)/2] - d^2 - 4X^2} \quad (2)$$

where $V$ is the average velocity of sound in water, $d$ is the distance between transmitter 2 and a receiver 4 or 4A, and $T_1$, $T_2$ are the elapsed time intervals associated with the reception of reflected pulses by receivers 4 and 4A, respectively. Computer 40 provides signals $E_5$ and $E_6$, corresponding to $X$ and $Y$, respectively.

Outputs $E_3$, $E_{3A}$ from circuits 22 and 22A, respectively, are applied to multipliers 43 and 44, respectively, where they are effectively squared to provide signals corresponding to the terms $T_1^2$ and $T_2^2$, respectively. Subtracting means 47 subtracts the output provided by multiplier 44 from the output provided by multiplier 43 to provide a signal corresponding to the term $(T_1^2 - T_2^2)$ in equation (1) to a multiplier 48. Voltage $E_8$, corresponding to the term $V$, is effectively squared by a multiplier 53 to provide a signal to a divider 54. Direct current voltages $E_9$, $E_{10}$, corresponding to the terms $d$ and 8, respectively, in the aforementioned equations, are multiplied with each other by a multiplier 55 and the resulting signal is applied to divider 54. Divider 54 divides the output from multiplier 53 with the signal from multiplier 55 to provide a signal corresponding to the term $V^2/8d$ in equation (1) to multiplier 48. Multiplier 48 multiplies the outputs from subtracting means 47 and divider 54 with each other to provide signal $E_5$.

Signal $E_6$, corresponding to the depth $Y$, is developed as follows. Summing means 60 sums the outputs from multipliers 43, 44 to provide a signal, corresponding to the term $(T_1^2 + T_2^2)$ in equation (2), to a multiplier 61. Multiplier 61 multiplies the signal from summing means 60 with the output from multiplier 53 to provide a signal to a divider 62. Divider 62 divides the output from multiplier 61 with voltage $E_{11}$, corresponding to the term 2, in the equation (2). A multiplier 63 effectively squares voltage $E_9$ to provide a signal to subtracting means 64 where it is subtracted from an output provided by divider 62. Subtracting means 64 provides a signal corresponding to the term $(V^2/2)(T_1^2 + T_2^2) - d^2$ in equation (2).

Multipliers 70, 71 effectively square signal $E_5$ and voltage $E_{11}$, respectively. The output from multipliers 70 and 71 are multiplied with each other by another multiplier 74 to provide an output corresponding to the term $4X^2$ in equation 2. Subtracting means 75 subtracts the output provided by multiplier 74 from the output provided by subtracting means 64 to provide a signal to a square root circuit 78 which in turn provides an output to a divider 80. Divider 80 divides the output from square root circuit 78 with voltage $E_{11}$ to provide signal $E_6$. Signals $E_5$ and $E_6$ are applied to a plotter 83 which may be of a type manufactured by Hewlett Packard under their part number 7591A. Plotter 83 receives a variable repetition pulse signal $E_{20}$ from a conventional pulse generator 84. Each pulse in signal $E_{20}$ moves the paper in plotter 83 a predetermined distance. The repetition rate of signal $E_{20}$ corresponds to the speed of boat 1 so that the paper movement is synchronized with the speed of boat 1.

Signal $E_5$ causes the pen in plotter 83 to move in the same direction as the paper moves or an opposite direction to provide for the offset distance $X$. Signal $E_6$ causes the pen to move in a direction which traverses the paper movement direction so that the distance of a mark from a side of the paper corresponds to the depth measurement.

The aforementioned fathometer has its best accuracy when the longitudinal axis of boat 1 is moving in the direction of the sloping surface. However, it may well be that there is a transverse slope to the bottom surface and that boat 1 may have a heading different than its bearing. Another embodiment of the present invention provides greater accuracy by considering the transverse slope and the yaw of boat 1 as it moves along its bearing. Referring to FIG. 5, there is shown an arrangement of boat 1, transmitter 2 and receivers 4, 4A and 4B. Transmitter 2 is located on longitudinal axis 6 of boat 1 along with receiver 4 which is separated from transmitter 2 by a distance $d_1$. Receivers 4A and 4B are a distance $d_2$ from transmitter 2 and are equal distance from the longitudinal axis 6. The distance $d_2$ lies along a radial line from transmitter 2 separated by an angle B from the longitudinal axis 6. A bearing line 92 indicates the bearing of boat 1 as it sails through the water.

An angle δ is the yaw angle between the bearing of boat 1 and longitudinal axis 6.

Referring to FIG. 6, the shortest reflective path from transmitter 2 to receiver 4 lies along lines 94 and 95 resulting from a transmitted pulse from transmitter 2 bouncing off a sloping surface 96 having a transverse slope as well as a longitudinal slope. Similarly the shortest path from transmitter 2 to receiver 4A lies along lines 99 and 100, while the shortest path to receiver 4B lies along lines 97 and 98. The depth measurement occurs above a point 101 on surface 96. A line 102 between transmitter 2 and point 101 is perpendicular to surface 96. Reference axes L, M are in the horizontal plane and are perpendicular to each other. Reference axis Z is perpendicular to axes L, M. Axes L, M and Z pass through transmitter 2, axis L is aligned with the heading of boat 1.

Referring to FIG. 7, point 101 may be projected to the surface of the water by a line 104 so that a corresponding surface point 105 lies on a radial line 106 passing through transmitter 2 and separated from axis L by an angle $\phi$. Line 102 is separated from axis Z by an angle $\Psi$. The length of line 102 is one-half the distance $D$ from transmitter 2 to an image point 110, which is hereinafter explained. The distance from transmitter 2 to the image point is determined from the following equation:

$$D = \sqrt{\frac{V^2\left(\frac{T_5^2}{2} + \frac{T_6^2}{2} + \frac{d_2}{d_1} T_4^2 \cos B\right) - d_2^2 - d_1 d_2 \cos B}{1 + \frac{d_2}{d_1} \cos B}}$$

(3)

where $V$ is the average velocity of sound in the water, time intervals $T_4$, $T_5$ and $T_6$ correspond to the time intervals starting with the transmission of a pulse from transmitter 2 and ending with the reception of reflected pulses by receivers 4, 4A and 4B, respectively.

Equations (4) through (6) describe angle $\phi$ in terms of its trigonometric functions:

$$\text{Tan } \phi = V^2(T_5^2 - T_6^2) \, d_1/2d_2(d_1^2 + D^2 - V^2T_4^2) \sin B$$

(4)

$$\text{Cos } \phi = 1/\sqrt{1 + \text{Tan}^2\phi}$$

(5)

$$\text{Sin } \phi = \text{Tan } \phi \text{ Cos } \phi$$

(6)

Equations 7, 8 describe the angle $\psi$ in terms of its trigonometric functions.

$$\text{Sin } \psi = d_1^2 + D^2 - V^2T_4^2/2d_1 \, D \cos \phi$$

(7)

$$\text{Cos } \psi = \sqrt{1 - \text{Sin}^2\psi}$$

(8)

The location of point 110 may be described with respect to transmitter 2 by vectors $X_O$, $Y_O$ and $Z_O$ using the following equations:

$$X_O = (D/2) \sin \psi \cos \phi$$

(9)

$$Y_O = (D/2) \sin \psi \sin \phi$$

(10)

$$Z_O = (D/2) \cos \psi$$

(11)

However, as noted before, due to the yaw of boat 1, the longitudinal axis of boat 1 may not be aligned with the bearing of the ship during time intervals $T_4$, $T_5$ and $T_6$. Therefore, equations 9, 10 must be modified by the yaw angle of boat 1 as is done in the following equations where $X'$ and $Y'$ are the compensated coordinates for point 101.

$$X' = X_O \cos \delta + Y_O \sin \delta$$

(12)

$$Y' = -X_O \sin \delta + Y \cos \delta$$

(13)

Figure 8:
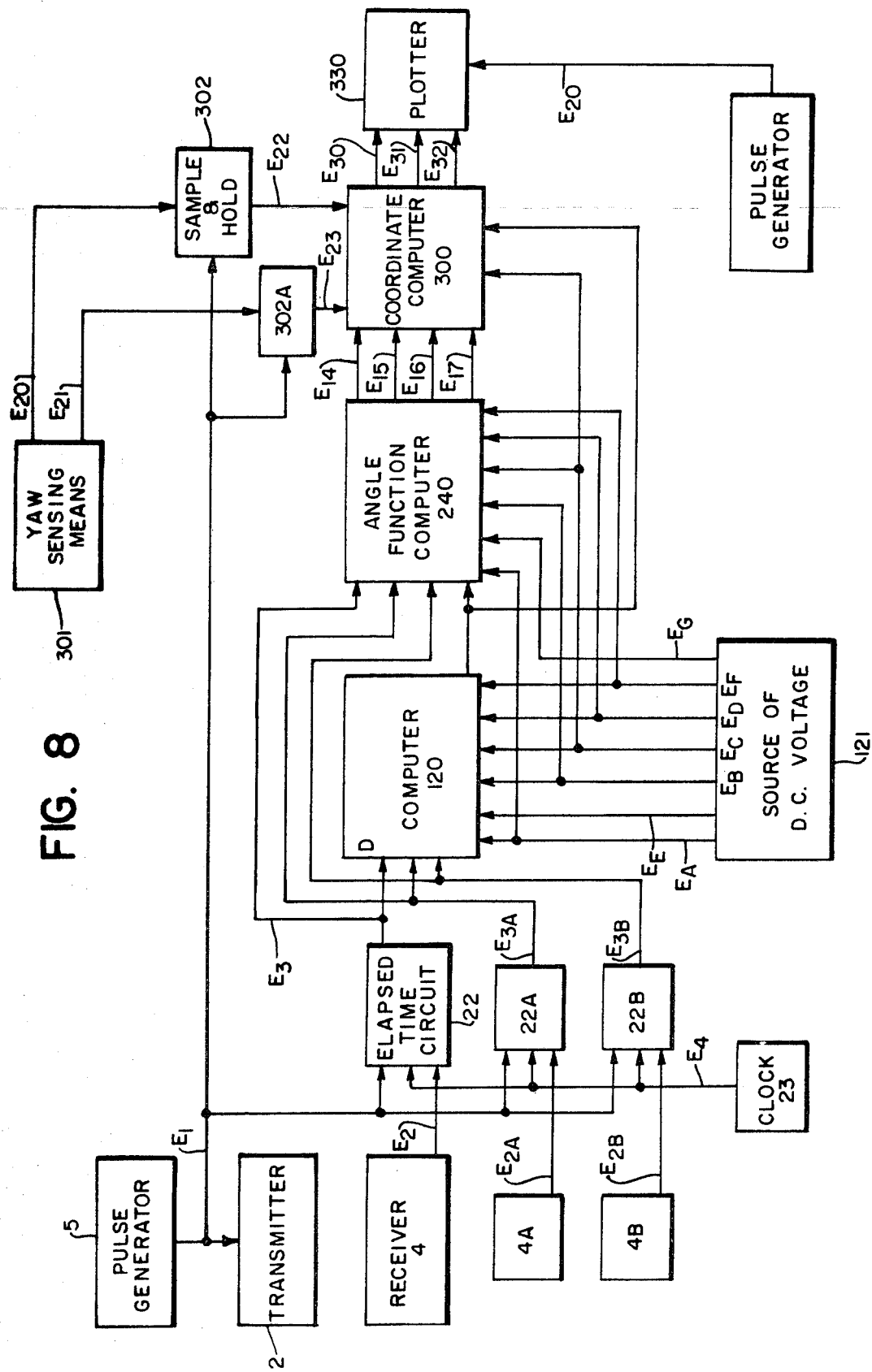
FIG. 8 is a simplified block diagram of the last mentioned fathometer for measuring the depth of the body of water and location the depth measurement with respect to a predetermined reference.

Referring to FIG. 8, a pulse $E_1$ from pulse generator 5 causes transmitter 2 to provide a pulse output which is reflected off surface 96 to receivers 4, 4A and 4B. Receivers 4, 4A and 4B provide pulse signals $E_2$, $E_{2A}$ and $E_{2B}$, respectively, to elapsed time circuits 22, 22A and 22B, respectively. Elapsed time circuits 22, 22A and 22B receive timing pulses $E_4$ from clock 23 and provide signals $E_3$, $E_{3A}$ and $E_{3B}$ corresponding to time intervals $T_4$, $T_5$ and $T_6$, respectively.

Figure 9:
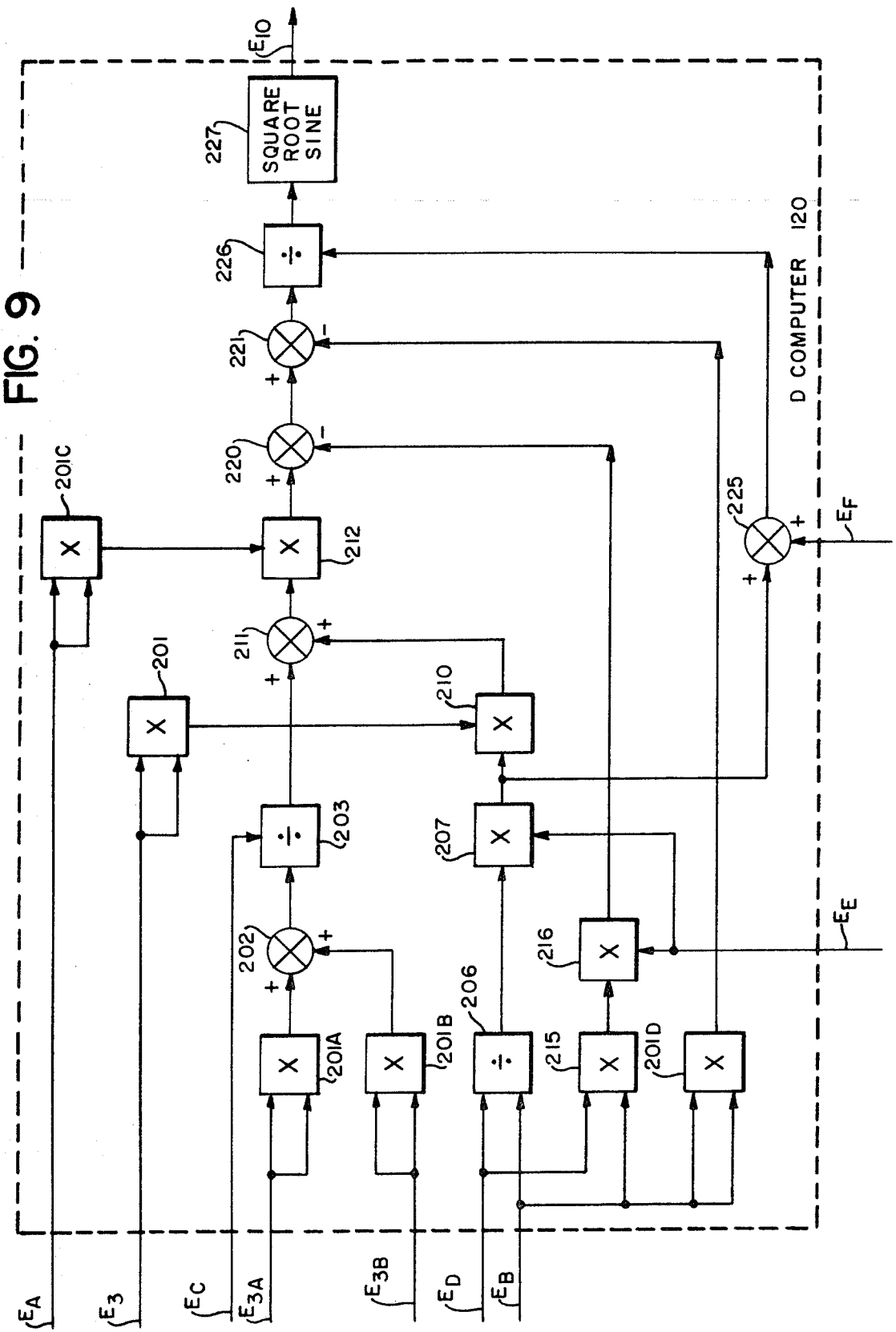
FIGS. 9 through 11 are the D computer, the angle function computer and the coordinate computer, respectively, shown in FIG. 8.

Referring to FIGS. 8 and 9, signals $E_3$, $E_{3A}$ and $E_{3B}$ are applied to a $D$ computer 120 which also receives direct current voltages $E_A$ through $E_F$ from a source 121 of direct current voltages. Computer 120 provides a signal $E_{10}$ corresponding to the distance $D$ in accordance with signals $E_3$ through $E_{3B}$ and direct current voltages $E_A$ through $E_F$ and equation (3). Multipliers 201 through 201D effectively square signals $E_3$ through $E_{3B}$ and voltages $E_A$ and $E_B$, respectively. Voltages $E_A$, $E_B$ correspond to the terms $V$ and $d_2$, respectively, in equation (3). Summing means 202 sums the outputs from multipliers 201A, 201B to provide a signal to a divider 203. Divider 203 divides the output from summing means 202 with voltage $E_C$, which corresponds to the term 2 in equation (3), to provide a signal corresponding to the term $T_5^2/2 + T_6^2/2$. Another divider 206 divides direct current voltage $E_B$ with direct current voltage $E_D$, which corresponds to the term $d_1$, to provide a signal to a multiplier 207. Multiplier 207 multiplies the output from divider 206 with voltage $E_E$, which corresponds to Cos B. The resulting signal is multiplied with the output from multiplier 201 by yet another multiplier 210 to provide a signal corresponding to the term $d_2/d_1 \, T_4^2 \cos B$ in equation 3. Summing means 211 sums the output of divider 203 with the output provided by multiplier 210 and the resulting sum signal is provided to multiplier 212. Multiplier 212 multiplies the sum signal from summing means 211 with the output from multiplier 201C to provide a signal corresponding to $V^2 ((T_5^2/2) + (T_6^2/2) + (d_2/d_1) \, T_4^2 \cos B)$ in equation (3).

Multipliers 215, 216 effectively multiply direct current voltages $E_B$, $E_D$ and $E_E$ to provide a signal corresponding to the term $d_1 d_2 \cos B$. Subtracting means 220 subtracts the output provided by multiplier 216 from the output provided by multiplier 212. Subtracting means 221 subtracts the output from multiplier 201D from the output provided by subtracting means 220.

Summing means 225 sums the output from multiplier 207 with voltage $E_F$, which corresponds to the term 1 in equation (3), to provide a signal corresponding to the term $1 + (d_2/d_1) \cos B$. A divider 226 divides the output from subtracting means 221 with the output from summing means 225. A square root circuit 227 provides signal $E_{10}$ which corresponds to the square root of the output provided by divider 226 and to the distance $D$ of equation (3).

Figure 10:
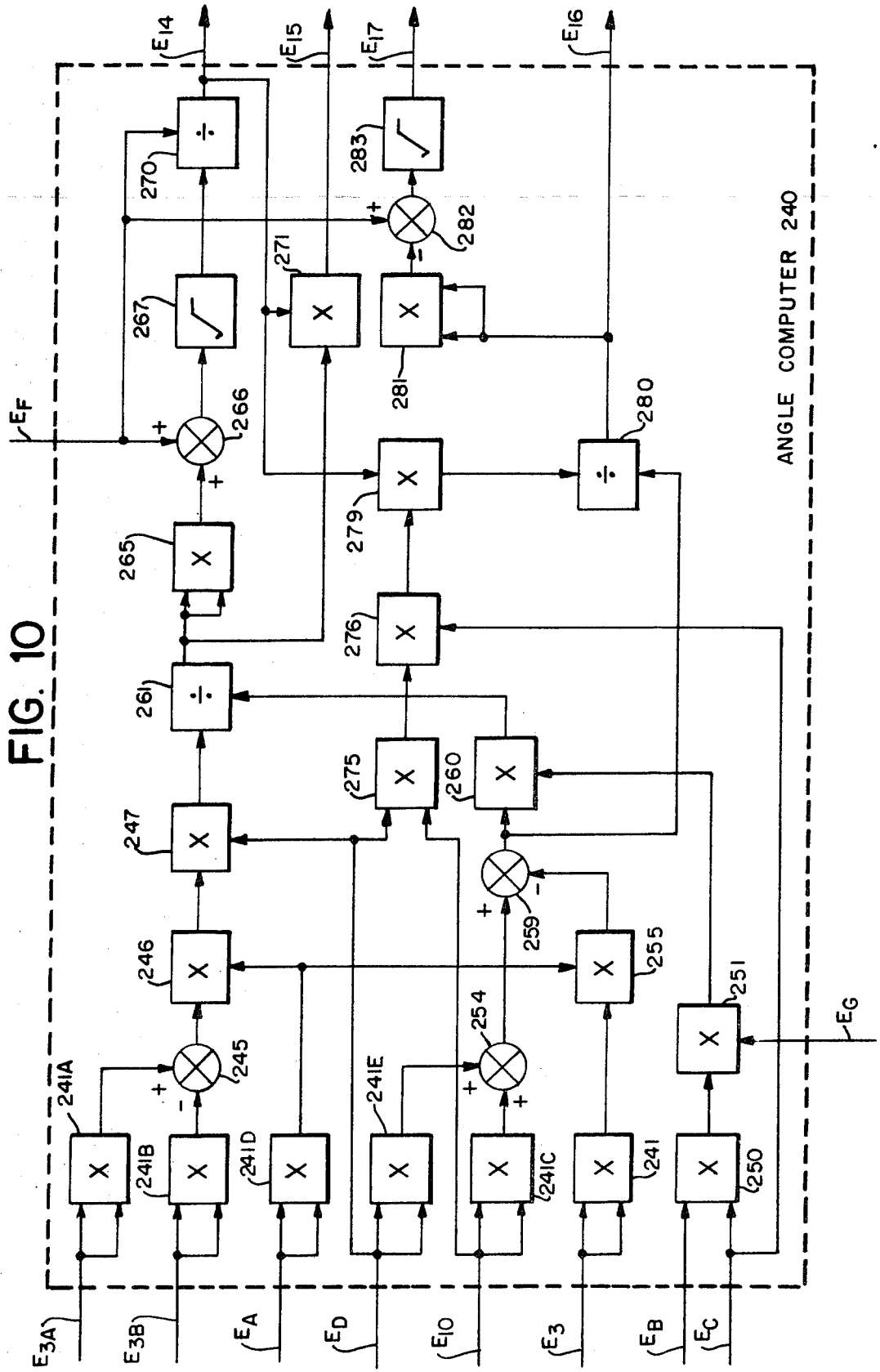

Referring to FIGS. 8 and 10, an angle function computer 240 receives signals $E_3$ through $E_{3B}$, signal $E_{10}$ and direct current voltages $E_A$ through $E_D$, $E_F$ and $E_G$ and provides signals $E_{14}$, $E_{15}$, $E_{16}$ and $E_{17}$ which correspond to the $\cos \phi$, $\sin \phi$, $\sin \psi$ and $\cos \psi$ in equations (4) through (8) in accordance with the received signals and voltages and equations (4) through (8). Multipliers 241 through 241E effectively square signals $E_3$ through $E_{3B}$, $E_{10}$ and voltages $E_A$ and $E_D$, respectively. Subtraction means 245 subtracts the output provided by multiplier 241B from the output provided by multiplier 241A to provide a signal corresponding to the term $T_5^2 - T_6^2$ in equation (4). Another multiplier 246 multiplies the outputs from subtracting means 245 and multiplier 241D to provide an output which is multiplied with direct current voltage $E_D$ by a multiplier 247 to provide a signal corresponding to the numerator of equation (4).

Multipliers 250, 251 effectively multiply voltages $E_B$, $E_C$ and $E_G$, which correspond to $\sin B$, to provide a signal corresponding to the term $2d_2 \sin B$ in equation (4). Summing means 254 sums the outputs from multipliers 241C and 241E to provide a signal corresponding to the term $d_1^2 + D^2$ in equation (4). A multiplier 255 multiplies the output from multipliers 241, 241D to provide a signal, which corresponds to $V^2 t_4^2$, which is subtracted from the output from summing means 254 by subtracting means 259. A multiplier 260 multiplies the output from subtracting means 259 with the output from multiplier 251 to provide signal corresponding to the denominator of equation (4). A divider 261 divides the output provided by multiplier 247 by the output provided by multiplier 260 to provide a signal corresponding to $\tan \phi$ of equation (4).

A multiplier 265 effectively squares the output from divider 261 and the resulting signal is summed with voltage $E_F$ to provide a signal corresponding to $1 + \tan^2 \phi$ in equation (5). A square root circuit 267 provides a signal corresponding to the square root of the output from summing means 266. A divider 270 divides direct current voltage $E_F$ with the output from square root circuit 267 to provide signal $E_{14}$ corresponding to $\cos \phi$.

A multiplier 271 multiplies the output of dividers 261, 270 with each other to provide signal $E_{15}$ corresponding to the term $\sin \phi$ in equation (6).

Multipliers 275, 276 effectively multiply voltages $E_C$, $E_D$ and signal $E_{10}$ to provide a signal corresponding to $2d_1 D$ in equation (7). The outputs of divider 270 and multiplier 276 are multiplied with each other by a multiplier 279 to provide a signal corresponding to the term $2d_1 D \cos \phi$ in equation (7). The output from subtracting means 259, which corresponds to the terms $D_1^2 + D^2 - V^2 t_4^2$ in equations (4) and (7), is divided by the output from multiplier 279 by a divider 280 to provide signal $E_{16}$ corresponding to $\sin \psi$.

A multiplier 281 effectively squares the output from divider 280 to provide a signal which is subtracted from voltage $E_F$ by subtracting means 282 to provide a signal corresponding to the term $1 - \sin^2 \psi$ in equation (8). A square root circuit 283 provides signal $E_{17}$ which corresponds to the square root of the output from subtracting means 282 and to $\cos \psi$.

Figure 11:
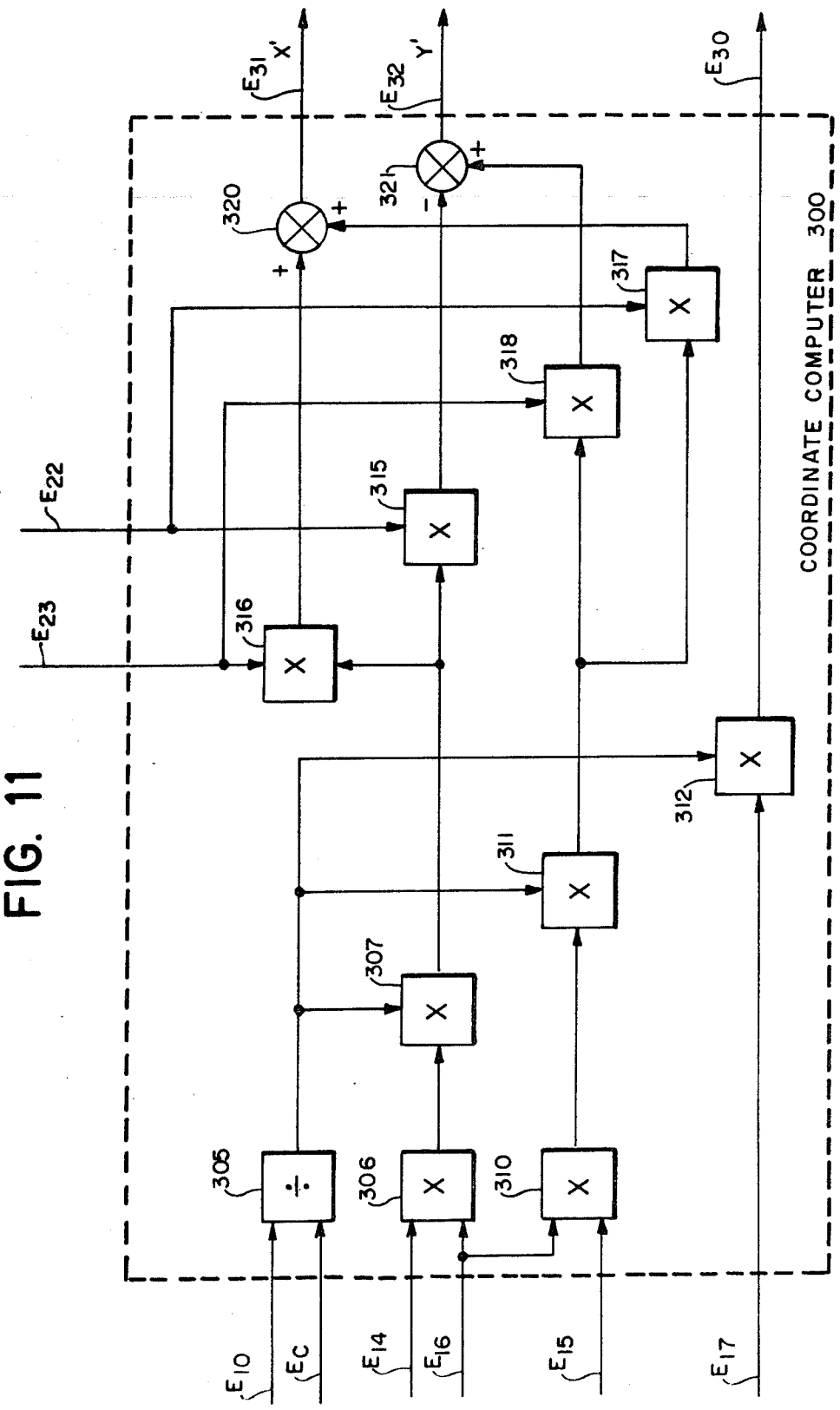

Referring to FIGS. 8 and 11, signals $E_{10}$ and $E_{14}$ through $E_{17}$ are applied to a coordinate computer 300 along with direct current voltage $E_C$ from source 121. Yaw sensing means 301 senses the yaw of the boat 1 relative to the bearing of boat 1 to provide signals $E_{20}$ and $E_{21}$ corresponding to the sine and cosine, respectively, of the yaw angle $\delta$. Pulse signal $E_1$ from pulse generator 5 causes sample and hold circuits 302, 302A to sample and hold signals $E_{20}$, $E_{21}$ periodically to provide signals $E_{22}$ and $E_{23}$, respectively. Time intervals $T_4$, $T_5$ and $T_6$ are so short that the error in angle $\delta$ due to movement of the ship is negligible. A divider 305 divides signal $E_{10}$ with voltage $E_C$ to provide a signal corresponding to the term $(D/2)$ in equations (9), (10) and (11). Multipliers 306 and 307 effectively multiply signals $E_{14}$, $E_{16}$ with the output from divider 305 to provide a signal corresponding to the term $X_0$ in equation 9. Multipliers 310 and 311 effectively multiply signals $E_{15}$ and $E_{16}$ with the output from divider 305 to provide a signal corresponding to the term $Y_0$ in equation 10. A multiplier 312 multiplies signal $E_{17}$ with the output from divider 305 to provide a signal $E_{32}$ corresponding to the term $Z_0$ in equation (11).

The output from multiplier 307 is multiplied with signals $E_{22}$ and $E_{23}$ by multipliers 315 and 316, respectively. Similarly, the output from multiplier 311 is multiplied with signals $E_{22}$ and $E_{23}$ by multipliers 317 and 318. Summing means 320 sums the output from multipliers 316, 317 to provide signal $E_{31}$ corresponding to the term $X'$ in equation (12). Subtracting means 321 subtracts the output provided by multiplier 315 from the output provided by multiplier 318 to provide signal $E_{32}$ which corresponds to the term $Y'$ in equation 13. A plotter 330 provides a record in accordance with signals $E_{30}$, $E_{31}$ and $E_{32}$ from computer 300 and pulse signals $E_{20}$ from pulse generator 84, of the depth measurement and the location of the depth measurement. Plotter 330 may be of the type manufactured by Hewlett Packard as part number 7591A.

Plotter 330 differs from plotter 84 in that it utilizes a second pen. Signals $E_{31}$, $E_{32}$ affect plotter 330 in the same manner as signals $E_5$ and $E_6$, respectively, affected plotter 84. Signal $E_{20}$ synchronizes the rate of paper movement with the speed of boat 1. Signal $E_{30}$ is applied to the second pen which moves in a direction traverse to the paper movement direction in accordance with signal $E_{30}$. The distance of the mark left by the second pen to a side of the paper corresponds to the distance $Y'$.

Although the device of the present invention has been described using analog computers, it is feasible to use a digital computer. In the first described embodiment, pulse signals $E_1$, $E_2$ and $E_{2B}$ may be applied to the digital computer. The digital computer is then programmed to solve equations (1) and (2).

In the second described embodiment, signals $E_1$, $E_2$, $E_{2A}$ and $E_{2B}$ may be applied to the digital computer. However, signals $E_{22}$ and $E_{23}$ are converted to digital signals by conventional analog-to-digital converters. The digital computer is programmed to solve equations (3) through (13).

The device of the present invention as heretofore described provides information for mapping the bottom surface beneath a body of water. The device provides a depth measurement and locates where the depth measurement was made. The device of the present invention as heretofore described is a fathometer having a transmitter and multiple receivers so that a surface beneath a body of water may be mapped without limitation as to that surface's physical configuration. The fathometer in one arrangement has the transmitter and two receivers aligned on the longitudinal axis of a boat so that the transmitter separates the receivers and each receiver is a predetermined distance from the transmitter.

In another embodiment the fathometer includes a transmitter and three receivers, the transmitter and one receiver being aligned on the longitudinal axis of the boat and separated by a first predetermined distance while the remaining receivers are aligned on an axis traversing the longitudinal axis of the boat and separated from each other by a second predetermined distance, each of the remaining receivers being separated from the transmitter by a third predetermined distance.

DERIVATION OF EQUATIONS (1) AND (2)

Equations (1), (2) were derived using an image point technique, such as described in Lessons in Seismic Computing by M. M. Slotnick, published by the Society of Exploration Geophysicists (Page 38). Referring to FIG. 1, a line 360 may be drawn from transmitter 2 to point 17. Line 360 is perpendicular to surface 9 at point 17. The location of image point 361 is found by extending line 360 as line 360' and making the length of line 360' equal to the length of line 360.

A straight line drawn from image point 361 to receiver 4 is divided by surface 9 at point 16 into component lines 12 and 12'. Line 8 is the straight line connecting transmitter 2 to point 16. According to image point theory, point 16 is the reflection point and lines 8 and 12 form the ray path of the energy transmitted from transmitter 2, reflected by surface 9, and received by receiver 4. Furthermore, line 12' is equal in length to line 8. Similar considerations apply to point 18 and lines 15, 15', and 14.

The sum of the lengths of lines 12, 12' is equal to the sum of the lengths of lines 8 and 12. From the triangle formed by lines 12 and 12', 360 and 360', and the distance $d$, a trigonometric equation may be written as:

$$A^2 = d^2 + D^2 - 2dD\cos(\pi/2 + \theta)$$

(14)

where $A$, $D$ are the distances from receiver 4 and transmitter 2, respectively, to image point 361.

Distance $A$ is equal to the sum of the lengths of lines 8, 12. The distance $A$ may also be defined as $$A = VT_1$$

(15)

where $V$ is the average velocity of the transmitted pulse in the water and $T_1$ is the elapsed time for the pulse to be transmitted from transmitter 2 to receiver 4 along lines 8, 12. Substituting for $A$, equation (14) may be rewritten as $$V^2 T_1^2 = d^2 (+ D^2 + 2dD \sin \theta$$

(16)

where $\sin \theta$ is equal to $-\cos(\pi/2 + \theta)$

A similar equation may be written for the triangle formed by transmitter 2, receiver 4A and image point 361.

$$V^2 T_2^2 = d^2 + D^2 - 2dD \sin \theta.$$

(17)

where $T_2$ is the time interval for the pulse to be transmitted from transmitter 2 to receiver 4A along lines 14, 15. The difference in signs of the last terms of equations (16), (17) is due to the cosine factor for the last mentioned triangle being $\cos(\pi/2 - \theta)$ which is equal to $\sin \theta$.

Equation (16) is added to and subtracted from equation (17) to provide equations (18) and (19), respectively, as follows:

$$V^2(T_1^2 + T_2^2) = 2d^2 + 2D^2 \text{ and}$$

(18)

$$V^2(T_1^2 - T_2^2) = 4dD \sin \theta.$$

(19)

However, the horizontal offset distance $X$, as shown in FIG. 1, is $$X = D/2 \sin \theta,$$

(20)

Therefore, equation (19) may be written as:

$$V^2(T_1^2 - T_2^2) = 8d(D/2) 2) \sin \theta = 8d X$$

(21)

Solving for X, equation (21) is written as $$X = V^2(T_1^2 - T_2^2)/8d$$

(22)

which is equation (1).

The depth Y of point 17 is determined as follows:

$$Y = \sqrt{(D)^2/2 - X^2}$$

(23)

or $$Y = \sqrt{D^2/4 - X^2}$$

(24)

Solving equation 18 for $D^2$, we have $$D^2 = [V^2 (T_1^2 + T_2^2)/2] - d^2$$

(25)

Substituting for $D^2$ in equation (24) from equation (25), equation (24) may be rewritten as $$Y = \sqrt{¼(V^2(T_1^2 + T_2^2)/2) - d^2 - X^2}$$

(26)

or $$Y = ½ \sqrt{(V^2(T_1^2 + T_2^2)/2) - d^2 - 4 x^2}$$

(27)

which is equation (2).

DERIVATION OF EQUATIONS 3 THROUGH 11

Equations similar to equations (16), (17) may be written from FIGS. 6 and 7 for three triangles defined by transmitter 2; receivers 4, 4A and 4B, and image point 110:

$$V^2 T_4^2 = d_1^2 + D^2 - 2Dd_1 \sin \psi \cos \theta \tag{28}$$

$$V^2 T_5^2 = d_2^2 + D^2 + 2Dd_2 \sin \psi \cos (\theta - B) \tag{29}$$

$$V^2 T_6^2 = d_2^2 + D^2 + 2Dd_2 \sin \psi \cos (\theta + B) \tag{30}$$

where $T_4$, $T_5$ and $T_6$ are time intervals between transmission of a pulse by transmitter 2 and reception of the reflected pulses by receivers 4, 4A and 4B, respectively, $\psi$ is the angle between line 102 and the Z axis; B is the angular relationship between transmitter 2, receiver 4A or 4B, and the longitudinal axis 6 of the boat 1, as shown in FIG. 5. $\theta$ is the angular relationship between a radial 106 line and reference axis L, $d_1$ is the distance between transmitter 2 and receiver 4, and $d_2$ is the distance between transmitter 2 and receiver 4A or 4B.

Combining equations (29), (30); we have $$(V^2/2)(T_5^2 + T_6^2) = d_2 + D^2 + 2Dd_2 \sin \psi \cos \theta \cos B. \tag{31}$$

Solving for $\sin \psi \cos \theta$ in equation (31), equation (31) may be rewritten as $$\sin \psi \cos \phi = \frac{\frac{V^2}{2}(T_5^2 + T_6^2) - d_2 - D^2}{2Dd_2 \cos B} \tag{32}$$

Substituting in equation (28) for sin cos $\theta$ from equation (32), equation 28 may be written as $$V^2 T_4^2 = d_1^2 + D^2 - dDd_1 \left( \frac{\frac{V^2}{2}(T_5^2 + T_6^2) - d_2 - D^2}{2Dd_2 \cos B} \right) \tag{33}$$

Simplifying equation (33), we have $$V^2 T_4^2 = d_1^2 + D^2 - (d_1/d_2 \cos B)((V_2^2/2)(T_5^2 + T_6^2) - d_2 - D^2), \tag{34}$$

or $$(V^2/2)(T_5^2 + T_6^2) = d_2^2 + D^2 + (d_2/d_1)(d_1^2 + D^2 - V^2 T_4^2)\cos B. \tag{35}$$

Solving for $D^2$, we initially have $$D^2(1 + \cos B (d_2/d_1)) = V^2(T_5^2/2 + T_6^2/2 + (d_2/d_1)T_4^2 \cos B) - d_2^2 - d_2 d_1 \cos B, \tag{36}$$

or $$D = \sqrt{\frac{V^2 \frac{T_5^2}{2} + \frac{T_6^2}{2} + \frac{d_2}{d_1} T_4 \cos B - d_2^2 - d_1 d_2 \cos B}{1 + \frac{d_2}{d_1} \cos B}} \tag{37}$$

which is equation (3).

Subtracting equation (30) from equation (29), we have $$V^2(T_5^2 - T_6^2) = 4Dd_2 \sin \psi \sin \theta \sin B. \tag{38}$$

Solving for $\sin \psi \sin \theta$, we have $$\sin \psi \sin \theta = V^2(T_5^2 - T_6^2)/4Dd_2 \sin B \tag{39}$$

Solving equation (28) for $\sin \psi \cos \theta$, equation (28) is rewritten as $$\sin \psi \cos \theta = d_1^2 + D^2 - V^2 T_4^2/2Dd_1 \tag{40}$$

The tangent of angle $\theta$ is obtained when equation (39) is divided by equation (40) as follows:

$$\tan \phi = \frac{\frac{V^2(T_5^2 - T_6^2)}{4Dd_2 \sin B}}{\frac{d_1^2 + D^2 - V^2 T_4^2}{2Dd_1}} \tag{41}$$

or $$\tan \theta = V^2(T_5^2 - T_6^2) d_1/2 \, d_2(d_1^2 + D^2 - V^2 T_4^2) \sin B \tag{42}$$

which is equation (4). Equations (5), (6) are basic trigonometric identities and will not be derived here.

Sin $\psi$ is obtained by directly solving equation (28).

$$\sin \psi = d_1^2 + D^2 - V^2 T_4^2/2d_1 D \cos \theta \tag{43}$$

which is equation (7).

Equation (8) is a basic trigonometric identity, and need not be derived.

Equations (9), (10) and (11) are developed as follows, using FIG. 7.

The length of line 94 is $D/2$ since point 101 always occurs halfway between transmitter 2 and image point 110. Therefore, the length of the radial line from transmitter 2 to surface point 105 is signal to $(D/2) \sin \psi$.

Using basic vector analysis, $X_0$, $Y_0$ and $Z_0$ are easily determined. Equations (12) and (13) can be easily determined by one skilled in the art.

What is claimed is:

1. Apparatus for providing outputs corresponding to a depth measurement in a body of water and to the location of the depth measurement, comprising means mounted on a boat along the longitudinal axis of the boat for transmitting a pulse through the water, two receivers mounted on the boat along the longitudinal axis of the boat and separated by the transmitting means, each receiver being a predetermined distance $d$ from the transmitting means and providing an output in response to a reflection of the transmitted pulse from a surface beneath the water, two elapsed time circuits being connected to the transmitting means and to a corresponding receiver and providing a signal corresponding to the elapsed time between the transmission of a pulse and the reception of its reflection by the receiver, and means connected to the receivers for providing the output corresponding to the depth $Y$ measurement and the location of the depth measurement which is a distance $X$ from a vertical axis passing through the transmitting means in accordance with the elapsed time signals and the following equations:

$$X = (V^2/8d)(T_1{}^2 - T_2{}^2)$$

and $$Y = \frac{1}{2}\sqrt{\frac{V^2}{2}(T_1{}^2 + T_2{}^2) - d^2 - 4X^2}$$

where $V$ is equal to the average velocity of sound in the water, $T_1$ is a time interval between the transmission of a pulse by the transmitting means and the reception of a reflection of the transmitted pulse by the receiver closest to the stern of the boat, $T_2$ is the time interval between the transmission of the pulse and the reception of another reflection of the transmitted pulse by the other receiver.

2. Apparatus as described in claim 1 further comprising means connected to the output means for providing a record of the depth measurement and the location of the depth measurement in accordance with the outputs from the output means.

3. Apparatus as described in claim 2 in which the transmitting means and a first receiver are mounted on a boat along a longitudinal axis of the boat, the first receiver being separated from the transmitting means by a predetermined distance $d_1$, second and third receivers are located at the second predetermined distance from each other along an axis traversing the longitudinal axis of the boat and at a third predetermined distance $d_2$ from the transmitting means so that a line drawn through the transmitting means and the second or third receiver is at an angle $B$ with the longitudinal axis of the boat, and the output means provides the outputs corresponding to the depth measurement and the location of the depth measurement in accordance with the following equations:

$$D = \sqrt{\frac{V^2(T_5{}^2 + T_6{}^2 + d_2 T_4{}^2 \cos B) - d_2{}^2 - d_1 d_2 \cos B}{1 + \frac{d_2}{d_1}\cos B}}$$

$\tan \theta = [V^2(T_5{}^2 - T_6{}^2)d_1]/[2 d_2 (d_1{}^2 + D^2 - V^2 T_4{}^2) \sin B]$,
$\cos \theta = 1/\sqrt{1 + \tan^2 \theta}$,
$\sin \theta = \tan \theta \cos \theta$,
$\sin \psi = (d_1{}^2 + D^2 - V^2 T_4{}^2)/2d_1 D \cos \theta$
$\cos \psi = 1 - \sin^2 \psi$,
$X_o = (D/2) \sin \psi \cos \theta$,
$Y_o = (D/2) \sin \psi \sin \theta$, and
$Z_o = (D/2) \cos \psi$ $D$ is the distance from the transmitting means to an image point; where $T_4$, $T_5$ and $T_6$ are the time intervals starting with a transmission of a pulse and ending with the reception of reflected pulses by the first, second and third receivers, respectively; $\theta$ is an angle formed by a reference axis corresponding to the bearing of the boat as the boat moves on the water and a line passing through the transmitting means and the location of the depth measurement, $\psi$ is an angle between a vertical axis passing through the transmitting means and an axis passing through the transmitting means and the image point, $X_o$ and $Y_o$ are outputs corresponding to the location of the depth measurement and are related to the vector components of the distance from the transmitting means to the location of the depth measurement along the bearing axis and along a second horizontal axis which is perpendicular to the bearing axis, the point of intersection between the bearing axis and the second axis occurs at the transmitting means, and $Z_o$ is the output corresponding to the depth measurement.

4. Apparatus as described in claim 3 further comprising means for sensing the yaw angle $\delta$ of the boat and providing signals corresponding to sin $\delta$ and cos $\delta$, and means connected to the output means to sensing means and to the recording means for correcting the $X_o$ and $Y_o$ outputs from the output means to compensate for the yaw angle of the boat and providing compensated signals to the recording means in accordance with the sin $\delta$ and cos $\delta$ signals from the sensing means and the following equations:

$$X' = X_o \cos \delta + Y_o \sin \delta$$

and $$Y' = -X_o \sin \delta + Y_o \cos \delta$$

where $X'$ and $Y'$ are the compensated signals.

5. A method for measuring depth of water and locating the depth measurement, which comprises transmitting a pulse through the water with a transmitter mounted along the longitudinal axis of a boat, receiving reflections of the transmitted pulse from a surface beneath the water with at least two receivers mounted along the longitudinal axis of the boat and separated by the transmitter, each receiver being a distance $d$ from the transmitter, determining time intervals, each time interval starting with the transmission of the transmitted pulse and ending with the reception of a reflected pulse by a corresponding receiver, and the location of the depth measurement of $X$ from a vertical axis passing through the transmitter, in accordance with the following equations: $X = (V^2/8d)(T_1{}^2 - T_2{}^2)$
and $$Y = \frac{1}{2}\sqrt{\frac{V^2}{2}(T_1{}^2 + T_2{}^2) - d^2 - 4X^2}$$

where $V$ is the average velocity of a pulse through water, $T_1$ is a time interval between the transmission of a pulse by the transmitter and the reception of a reflection of the transmitted pulse by a receiver nearest the stern of the boat and $T_2$ is a time interval between the transmission of the pulse and the reception of another reflection of the transmitted pulse by the receiver nearest the bow of the boat.

6. A method as described in claim 5, which further comprises recording the depth measurement and the location of the depth measurement in accordance with the outputs corresponding thereto.

7. A method as described in claim 6 in which the transmitting step includes locating the means transmitting the pulse on the longitudinal axis of the boat, the receiving step includes locating a first receiver on the longitudinal axis of the boat a predetermined distance $d_1$ from the transmitting means, second and third receivers are located by a second predetermined distance from each other along an axis traversing the longitudinal axis of the boat and at a third predetermined distance $d_2$ from the transmitting means and the second or third receiver is at an angle $B$ with the longitudinal axis of the boat, and the providing step includes providing the outputs corresponding to the depth measurement and the location of the depth measurement in accordance with the following equations:

$$D = \sqrt{\frac{V^2\left(\frac{T_5^2}{2}+\frac{T_6^2}{2}+\frac{d_2}{d_1}T_4^2 \cos B\right)-d_2^2-d_1 d_2 \cos B}{1+\frac{d_2}{d_1}\cos B}}$$

$\text{Tan } \theta = [V^2(T_5^2 - T_6^2)d_1 ]/[2\, d_2\, (d_1^2 + D^2 - V^2\, T_4^2) \sin B]$ $\text{Cos } \theta = 1/\sqrt{1 + \text{Tan}^2 \theta}$ $\text{Sin } \theta = \text{Tan } \theta \text{ Cos } \theta$ $\text{Sin } \psi = d_1^2 + D^2 - V^2 T_4^2 / 2\, d_1\, D \cos \theta$ $\text{Cos } \psi = \sqrt{1 - \sin^2}$ $X_o = D/2 \sin \psi \cos \theta$ $Y_o = D/2 \sin \psi \sin \theta$, and $Z_o = D/2 \cos \psi$ $D$ is the distance from the transmitting means to an image point; where $T_4$, $T_5$ and $T_6$ are the time intervals starting with a transmission of a pulse and ending with the reception of reflected pulses by the first, second and third receivers, respectively; $\theta$ is an angle formed by a reference axis corresponding to the bearing of the boat as the boat moves on the water and a line passing through the transmitting means and the location of the depth measurement, $\psi$ is an angle between a vertical axis passing through the transmitting means and an axis passing through the transmitting means and the image point, $X_o$ and $Y_o$ are outputs corresponding to the location of the depth measurement and are related to the vector components of the distance from the transmitting means to the location of the depth measurement and are related to the vector components of the distance from the transmitting means to the location of the depth measurement along the bearing axis and along a second horizontal axis which is perpendicular to the bearing axis, the point of intersection between the bearing axis and the second axis occurs at the transmitting means, and $Z_o$ is the output corresponding to the depth measurement.

\* \* \* \* \*